Jan. 6, 1970   V. J. RIGOLINI ET AL   3,487,758
CAMERA FLASH UNIT ROTATING MECHANISM
Filed Nov. 23, 1966   4 Sheets-Sheet 2

Jan. 6, 1970  V. J. RIGOLINI ET AL  3,487,758
CAMERA FLASH UNIT ROTATING MECHANISM
Filed Nov. 23, 1966  4 Sheets-Sheet 3

Jan. 6, 1970   V. J. RIGOLINI ET AL   3,487,758
CAMERA FLASH UNIT ROTATING MECHANISM
Filed Nov. 23, 1966   4 Sheets-Sheet 4
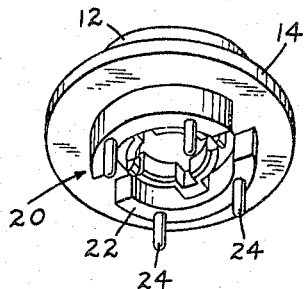
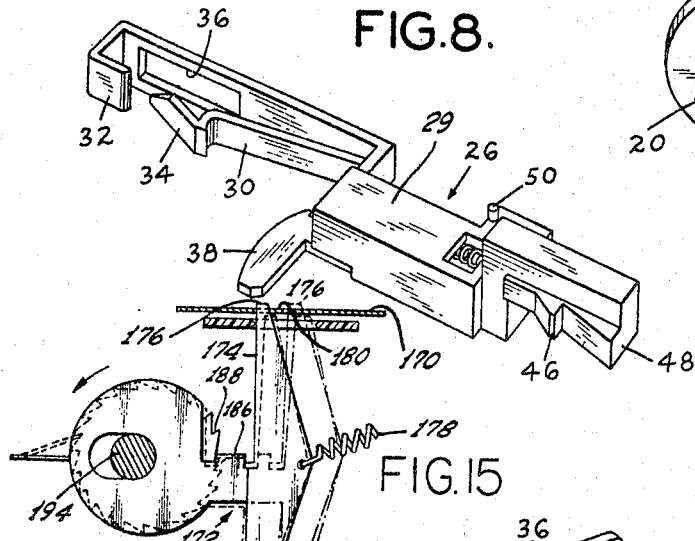
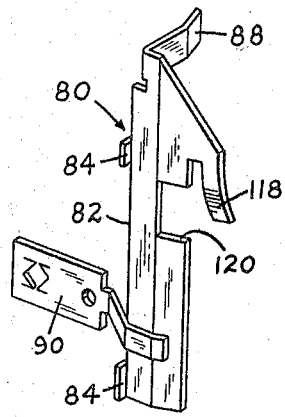
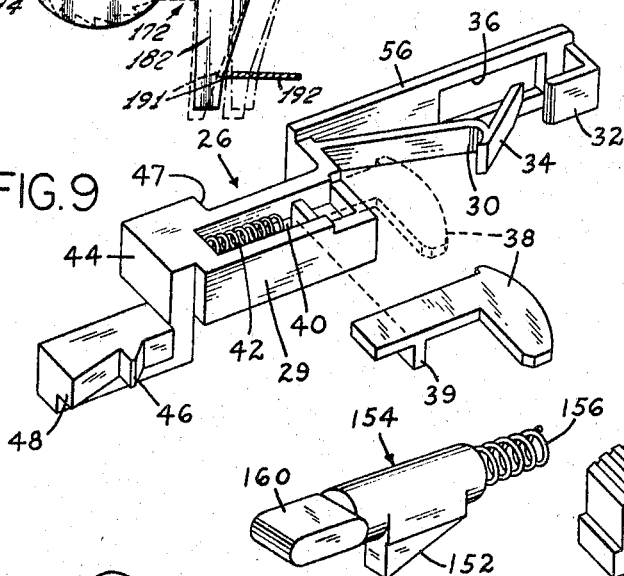
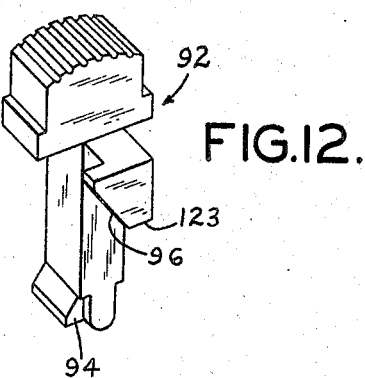
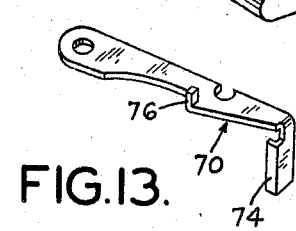

United States Patent Office 3,487,758
Patented Jan. 6, 1970

3,487,758
CAMERA FLASH UNIT ROTATING MECHANISM
Venerio J. Rigolini, Dino A. Liverano, and Luiz G. Lopez, Brooklyn, N.Y., assignors to Whitehouse Products, Inc., Brooklyn, N.Y., a corporation of New York
Filed Nov. 23, 1966, Ser. No. 596,620
Int. Cl. G03b 19/00, 9/70, 19/04
U.S. Cl. 95—11
21 Claims

ABSTRACT OF THE DISCLOSURE

Apparatus for automatically advancing a flash tube on a camera to bring a fresh flash bulb to a firing position after each picture is taken. The socket carrying the flash cube is rotated by a reciprocable pawl cooperating with a pinwheel mechanism, which aligns the socket at the end of the first full stroke of the film winding lever and then is prevented from rotating it further until after a picture has been taken. A metering plate halts the advance of film and locks the winding lever against advancement whenever the film has been advanced to frame an unexposed portion thereof, and the shutter mechanism includes a tripping member which actuates the shutter and thereafter; frees the mechanism so it can bring a fresh flash bulb to its firing position, synchronizes the flash by completing an electrical circuit, and contacts the metering plate to unlock the winding lever.

---

This invention relates to photographic cameras which are usable with flashlamp units containing a plurality of flash bulbs, and more particularly to such cameras as are adapted to automatically rotate such units to bring a new flash bulb into firing position after each flash picture is taken.

Cameras of this type have become available recently and are generally provided with a rotatable element to which the lamp unit is connected. Generally this element is a socket in which the foot of the lamp unit is inserted, but it may also be a post on which the lamp unit is mounted. In both cases the important fact is that the element is turned a predetermined amount each time it is advanced and then is held in position to keep one of the flash bulb/reflector combinations in the unit facing the front of the camera and aligned in the proper firing locus. U.S. Patent No. 3,244,087 contains a detailed decription of one such unit. After the bulb is fired, the unit is automatically rotated the same amount again, and a fresh bulb/reflector combination is aligned and made ready for the next flash picture. In prior cameras of this type the means for automatically rotating the lamp unit have not been wholly satisfactory. Just prior to firing the flash bulb, for example, the socket or post may become unlocked and free to rotate thereby allowing the bulb to be moved out of its firing locus before the picture is taken.

One object of this invention, therefore, is to provide an improved photographic camera which is adapted to use and automatically rotate a flashlamp unit containing a plurality of flash bulbs.

Another object is to provide such a camera in which the means for rotating the flashlamp unit are less complex and of simpler design than heretofore.

A further object is to provide a camera having the above characteristics with the ability to automatically align a fresh flash bulb in its proper firing locus after each flash picture is taken and to lock it in that locus during the taking of the next flash picture.

Other, further and additional objects will become apparent from the drawings and description of one embodiment of the invention, the novel features of which will be particularly pointed out in the appended claims.

Though in the preferred embodiment of the present invention the rotatable element for carrying the flashlamp unit comprises a socket which receives and holds the foot of the lamp unit, that element could also comprise a post or some other suitable mounting structure. For available light pictures the lamp unit is taken off the camera by removing it from the socket. It is reinserted the next time a flash picture is wanted.

Attached to the bottom of the socket element is a pinwheel which cooperates with a flexible pawl to rotate the socket after each picture is taken. The pawl is part of an actuator assembly which oscillates between a rest and a cocked position. As will be explained more fully in the detailed description hereinafter, moving the camera's film winding lever through its first full winding stroke after a picture is taken drives the assembly from its rest to its cocked position. During this movement the pawl slides over and then engages one of the pins on the pinwheel. As the shutter button is released just after a picture has been taken, the assembly is spring returned to its rest position, and as it returns the socket is rotated a predetermined amount by the pawl which pulls the engaged pin to a new position. When the assembly is cocked again, the pawl disengages from the pin just moved and slides over and engages another pin in the former position of the pin just disengaged.

Each time the assembly is returned to its rest position, the socket is rotated a predetermined amount by the pawl pulling the pin with which it is engaged through a predetermined arc. The precise length of this arc is determined by the radius of the pinwheel, the spacing of the pins on the pinwheel and the distance the assembly travels between its cocked and rest positions. For the purpose of illustrating the invention, a 90° rotation of the pinwheel has been chosen and this is accomplished by providing the pinwheel with four pins, spaced 90° apart around its circumference. The travel of the actuator assembly is calculated to be just sufficient to cause the pawl to move the pin which it engages through a 90° arc as the assembly moves from the cocked to the rest position.

Rotation of the socket is halted not only by the arrival of the assembly at its rest position, but also by a pinstop element provided on the assembly which is moved into the path of travel of one of the nonengaged pins as the assembly reaches its rest position. Reverse rotation of the socket is prevented when the assembly is at rest by the pawl which still engages the pin it has just finished moving. Thus the socket is locked in a new position in which the lamp unit is properly aligned for the next flash picture.

This is only a preliminary alignment, however, because the film has yet to be wound for the next exposure and the actuator assembly returned to its cocked position before the next picture can be taken. To maintain this preliminary alignment and provide the accurate final alignment that is desirable, the assembly is provided with a slidable spring biased foot which contacts one of the pins on the pinwheel as the assembly is being cocked and holds the pinwheel against any substantial reverse rotation which otherwise might occur due to the sliding contact of the pawl with the pin it slides over and engages during the cocking movement. Since this foot is mounted on the assembly, it pushes this pin with more and more force as the assembly moves until when its cocked position has been reached the foot has rotated the pinwheel and socket into alignment and wedged itself between and into contact with two of the pins on the wheel so the socket cannot rotate further. The spring force behind the foot firmly maintains this wedging action thereby locking the socket in position until the next picture has been taken and the assembly is moved again.

Before describing it in detail, two additional aspects of the invention should be noted. The first relates to the means by which the actuator assembly is maintained cocked until the camera shutter has been tripped. Before the shutter button is depressed to take a picture, the assembly is held cocked by a lock member having a locking arm which is engaged with a tooth on the assembly. This member is pivotable about one of its edges so that the arm can be swung into or out of the path of travel of the assembly tooth for engagement or disengagement therewith. A biasing spring is mounted on the camera body to pivot the member in a direction to swing the arm behind the tooth to engage the same to render the assembly inoperative after it has reached its cocked position. It is rendered operative again only after the picture has been taken. The engagement of the tooth with the locking arm is maintained by the tension spring which continuously urges the assembly toward its rest position so in order to disengage the arm the force of the spring on the assembly must first be relieved. This is accomplished by depressing the shutter button which has an actuator release cam formed integrally with it. As the button is depressed, this cam engages the rear end of the assembly and drives it forward a short distance until the arm is free and can be swung away from the tooth. Further depression of the shutter button trips the shutter. To unlock the assembly the shutter is provided with a synchronizing arm which completes the flash circuitry to fire the flash bulb after the shutter is tripped and then pivots the locking member so as to swing the lock arm away from the assembly tooth. In performing this function the arm necessarily overcomes the force of the lock member biasing spring and leaves the assembly in an operative condition except for its contact with the release cam. As the shutter button is released, the actuator release cam moves out of the path of the assembly making it operative and allowing it to be snapped back to its rest position by the tension spring.

The other aspect of the invention which should be mentioned briefly at this point concerns the means for changing the speed of the camera shutter when a flashlamp unit is inserted into or removed from the socket. It is known to increase the exposure time of film when a flash bulb is used and this has been done automatically in the past by inserting a flash bulb into its socket as shown by the co-pending patent application of V. J. Rigolini (one of the present joint inventors), namely, U.S. patent application No. 458,593, filed May 25, 1965. According to the present invention a new feature is added to the prior Rigolini disclosure which feature comprises an ejector rod for separating the flashlamp unit from the camera. The bottom of the rod comprises two separate cam surfaces one of which automatically operates the shutter speed changing mechanism when a flashlamp is inserted in the socket. The other is acted upon by the ejector button to drive the rod upwardly to eject a flashlamp from the socket whenever that button is pushed.

Other features of the invention will be mentioned in connection with the detailed description which follows hereinafter, and from the drawings in which:

FIG. 8 is an isometric view from below of the actuator assembly shown in FIG. 5.

FIG. 9 is a partially exploded isometric reverse view of the actuator assembly of FIG. 1 taken from above and showing the proper position of the aligning foot in phantom.

FIG. 10 is an isometric view of the socket for the flash unit from below.

FIG. 11 is an isometric view of the lock member for rendering the actuator assembly inoperative.

FIG. 12 is an isometric view of the shutter button showing the actuator release cam on its rear face.

FIG. 13 is an isometric view of the winding arm pawl which prevents the film winding lever from being returned to its initial position until the actuator assembly is fully cocked.

FIG. 14 is an isometric view of the bottom of ejector button and return spring for removing flash units from the camera.

FIG. 15 is a plan view of a metering plate and its operational relationship with the winding mechanism to halt the advance of film and lock the winding lever against advancement when the film has been advanced to frame an unexposed portion in preparation for taking the next picture.

Figure 1:
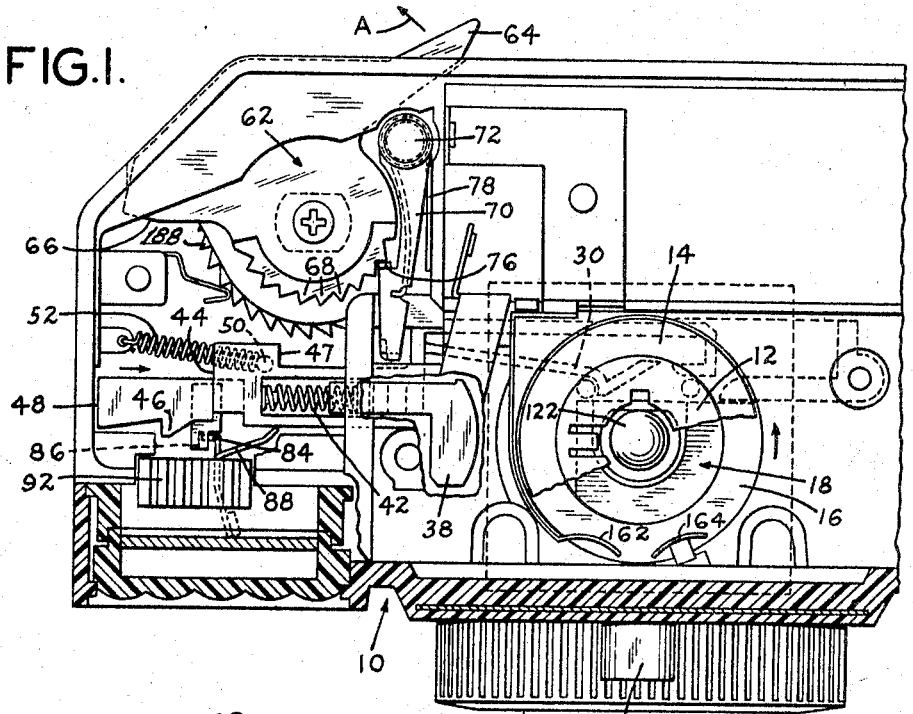
FIG. 1 is a plan view of a portion of the top of a camera according to the invention with the cover removed and certain areas partially cut away showing the actuator assembly in its rest position.

Referring now particularly to FIGS. 1 and 10, the camera includes a body 10, in which the flashlamp socket 12 is rotatably mounted by a collar 14 which rests on a camera body lip 16. The lip defines an annular opening 18 in the body into which the pinwheel 20 fits. The pinwheel (see FIG. 10) is preferably integral with the socket and includes a ringlike structure 22 comprising an annulus with a rectangular cross section from which two diametrically opposite portions of the structure have been removed. A plurality of pins 24 extend perpendicularly from the plane of the structure to complete the pinwheel.

Figure 5:
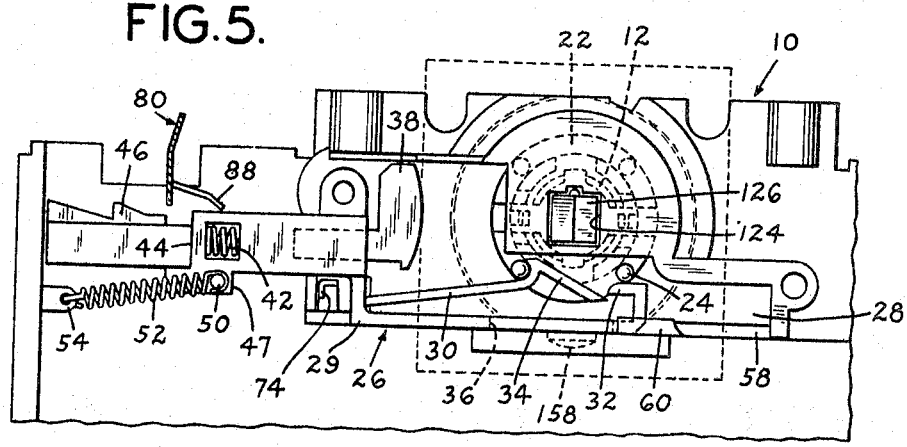
FIG. 5 is a plan view of a portion of the apparatus of FIG. 2 taken generally on line 5—5 of that figure showing a bottom or underneath view of the actuator assembly in its rest position.

Referring now to FIGS. 5, 8 and 9, the actuator assembly 26 is mounted in a slideway 28 in the camera body and includes a frame 29 on which is mounted the flexible pawl 30 and the pinstop element 32 spoken of hereinbefore. A slider 34 is mounted at the forward end of the pawl to cause the pawl to flex and slide over one of the pins 24 as the assembly is being cocked. A window 36 in the frame allows the pawl to be flexed without obstruction of the slider by the assembly frame 29. An aligning foot 38 slides on the frame and has a driving leg 39 which extends into a chamber 40 in the frame and is biased forwardly in the chamber by a spring 42 best seen in FIG. 9. On the rear half of the frame is a cocking face 44, a tooth 46, a cam face 47 and a rear face 48, the functions of each of which will be explained in more detail hereinafter. On the underside of the frame is a pin 50 to which one end of an actuator spring 52 is attached. The other end of this spring is hooked to a detent 54 on the camera body. On the upper side of frame 29 is a rib 56 which fits in a groove 58 at one side of slideway 28 in the camera body to keep the motion of the assembly in a straight line. A dog 60, mounted on the camera body just below frame 29 (above as seen in FIG. 5), holds the frame up and keeps the rib in the groove at all times.

Figure 3:
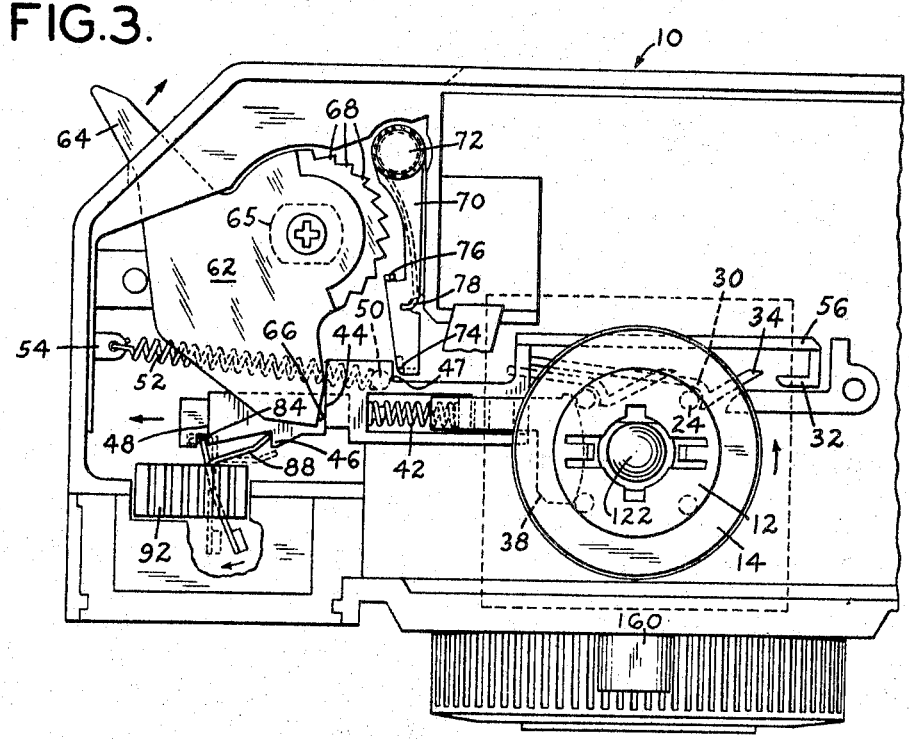
FIG. 3 is a plan view of the embodiment of FIG. 1 with the actuator assembly being driven into its cocked position by the film advancing lever.
Figure 4:
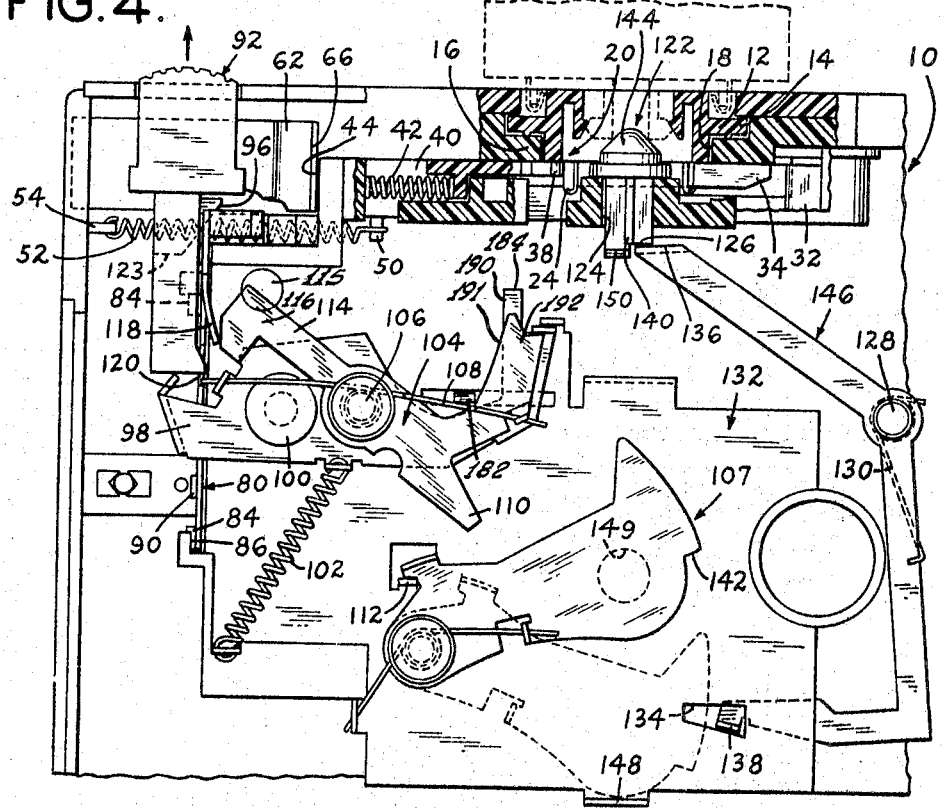
FIG. 4 is an elevation view of the apparatus of FIG. 3 after the actuator assembly has been cocked and after the shutter button has been depressed and the shutter actuated.

Referring now to FIGS. 1, 3 and 4, the action of the film winding lever 62 in cocking the actuator assembly will be discussed. Lever 62 is mounted to rotate a shaft 65 which includes conventional means for winding film onto the takeup spool of a standard cartridge such as is disclosed in the aforementioned Rigolini application and patents mentioned therein. The film is advanced whenever the lever is moved from its rest position in the direction of arrow A but remains stationary when moved through a return stroke in the opposite direction. Conventional spring means (not shown) are provided to urge the lever toward its rest position (see FIG. 1) whenever it is released.

Lever 62 has a tip portion 64 at one end and a cam face 66 at the other, and when the camera user grasps the tip and moves it in the direction of arrow A, face 66 moves counterclockwise in an arc toward face 44 on actuator assembly 26. Further rotation of lever 62 in this direction causes 66 to engage the face 44 and drive the assembly from its rest position, shown in FIG. 1, toward its cocked position, shown in FIGS. 3 and 6.

Referring now to FIGS. 1, 3 and 13, lever 62 also forms part of a pawl and ratchet mechanism whereby the lever cannot be returned toward its rest position until it has completed one full counterclockwise stroke during which assembly 26 has become cocked. For this purpose the lever is provided with a plurality of radially extending teeth 68 adjacent which lies a pawl 70 which is pivotally mounted about a pin 72 at one end and formed into a follower 74 at the opposite end. Between these ends is an upstanding finger 76 which is engageable with teeth 68 when the pawl is pivoted toward them but remains free of the teeth when pivoted in the opposite direction. A spring 78 is mounted on the camera body to engage and pivot the pawl so finger 76 normally engages teeth 68. The teeth are formed to slide past the finger when moving counterclockwise, but to engage the same and prevent substantial rotation of the lever in the opposite direction. Just before lever 62 completes its first full winding stroke, however (i.e. just before the actuator assembly reaches its cocked position), cam face 47 on the assembly (see FIGS. 5 and 9) engages follower 74 and swings pawl 70 away from the lever so that finger 76 is out of contact with teeth 68. The pawl remains free of teeth 68 as long as assembly 26 is cocked thus permitting lever 62 to be spring returned to its rest position where it may be given one or more further winding strokes as needed to advance the film into position for the next picture.

Referring now to FIGS. 1, 2, 3, 4 and 11, the locking member 80 and how it renders the assembly inoperative will be described. Member 80 is mounted along an edge 82 by a pair of dogs 84 which lie in two recesses 86 in the camera body. The member is pivotable about edge 82 but is otherwise kept in place by dogs 84. At the top of the member is a lock arm 88 which lies adjacent the path of movement of assembly tooth 46 and normally intersects that path under the influence of biasing spring 90 which pivots the lock member to achieve this result. As the actuator assembly is being cocked, tooth 46 moves towards arm 88 and slides underneath and slightly beyond it allowing the arm to be pushed into position behind the tooth by spring 90 as the tooth passes by. Just before this occurs, pawl 70 is pushed away from teeth 68, and lever 62 is free to return to its rest position. When the lever is released, spring 52 tries to return the assembly to its rest position and causes the tooth to engage the arm thus locking the assembly in its cocked position thereby rendering it inoperative.

Figure 2:
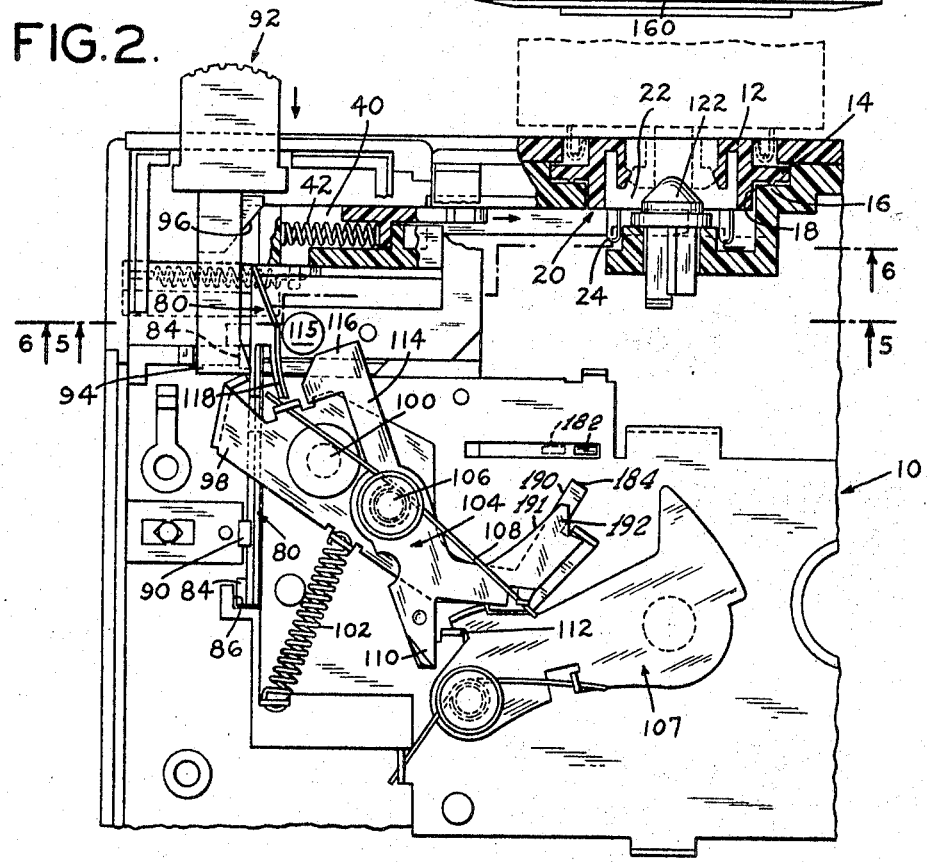
FIG. 2 is an elevation view of the embodiment of FIG. 1 with the front cover of the camera removed and the upper portion shown partially in section.

Referring now to FIGS. 2, 4 and 12, the operation of the shutter button 92 in tripping the shutter mechanism and rendering the assembly operative again will be described. Button 92 has a foot 94 and an actuator release cam 96. Adjacent the bottom of foot 94 is one end of a shutter release lever 98 which is pivotable about a pin 100 forming part of the shutter mechanism. A tension spring 102 attached between the lever on one side of the pin and the camera body causes the portion of the lever on the opposite side of the pin against which the shutter button foot lies to push against locking member 80 and pivot it in the same direction as spring 90. Release lever 98 carries a tripping member 104 which is pivotally mounted about a pin 106 mounted on the lever. Member 104 is driven by spring 108 and not only trips the shutter 107 when its heel 110 slides past tab 112, as the shutter button is depressed, it also has a synchronizing arm portion 114 which completes the electrical flash circuitry in the camera to fire the flash bulbs as it touches a contact 115 just after the shutter is tripped. Arm portion 114 is provided with a head 116 which performs still another function, namely that of driving release arm 118 on member 80 against the force of spring 90 to swing lock arm 88 out of the path of travel of actuator assembly tooth 46 after the bulb has fired.

Referring to FIG. 15, the camera of FIG. 1 includes a cartridge in which a film 170 is drawn from a spool containing unexposed film to a take-up spool by a winding mechanism operated by lever 62. A metering plate 172 includes a finger portion 174, the end 176 of which is caused to resiliently contact the edge of film 170 by means of a spring 178. Normally it is retracted by spring 178 to its rightwardmost dot and dash line position until a slot (i.e. aperture) 180 on the edge of film 170 receives the end 176 of finger 174. Prior to this action, a leg 182 of plate 172 overlies the end 184 (FIG. 2) of shutter release lever 98.

In the position of the parts shown in FIG. 2, the abutment 184 on release lever 98 is aligned with a double-exposure prevention finger 182 of plate 172 (FIG. 15), indicating that the winding mechanism must be operated to frame an unexposed portion of the film. Accordingly, operation of the winding lever 62 (FIG. 1) causes film 170 to move from right to left until the end 176 of finger 174 engages slot 180 on the film edge. Continued movement of film 170 to the left moves plate 172 to the left until a tab 186 thereon engages the ratchet teeth 188 of the winding device, preventing its further operation. This moves finger 182 to its dotted position (FIG. 2) so that shutter button 92 can be depressed, thus turning release lever 98 counterclockwise toward the dotted position shown in FIG. 2. A cam surface 190 (FIG. 2) on the side edge of abutment 184 forces finger 182 and plate 172 further leftward to the solid position shown in FIG. 15, causing the winding device to move in a reverse direction about the distance of one of its ratchet teeth, thereby providing some slack in the film 170. At the same time, the heel 110 is moved counterclockwise to a point clearing tab 112 and striking shutter 107. Thereafter heel 110 and tripping member 104 continue counterclockwise and cause cam surface 191 on member 104 and on the edge of a toe portion 192 thereof to act on finger 182 to pivot plate 172 about the axis 194 of the winding device to release the end 176 from the aperture 180 so that spring 178 can return plate 172 to its rest position and release tab 186 from the teeth 188 of the winding device for further action.

Referring now to FIGS. 3 and 4, as mentioned hereinbefore, with the assembly in the cocked position tooth 46 engages arm 88 under the influence of spring 52 and until this engagement is broken the arm cannot be swung out of the way. The required disengaging force is provided by cam 96 which contacts rear face 48 of the actuator assembly when shutter button 92 is depressed. Depression of the shutter button also moves release lever 98 in a downward arc about pin 100 away from lock member 80 thus freeing it from influence by the lever. Further depression of button 92 causes assembly face 48 to slide up cam 96 which pushes the assembly forward slightly as the button is depressed thereby disengaging tooth 46 and freeing the lock arm. Still further depression of button 92 trips the shutter, synchronizes the flash and pivots the member 80 to swing the lock arm free of the path of travel of tooth 46. A window 120 in member 80 prevents the latter from contacting shutter button foot 94 as the member is pivoted.

At this point only the engagement of cam 96 with assembly face 48 prevents the assembly from returning to its rest position. As the button is released the assembly is rendered operative and face 48 slides down cam 96 until the two are no longer in contact and the assembly is snapped back to its rest position by spring 52. As is suggested in FIG. 2, when the shutter button is fully released and back in its original position with the actuator assembly in its rest position the flat bottom portion 123 of cam 96 lies directly above tooth 46. The presence of this tooth in the path of movement of cam bottom 123 prevents the button from being depressed again until the assembly is once again cocked.

Figure 6:
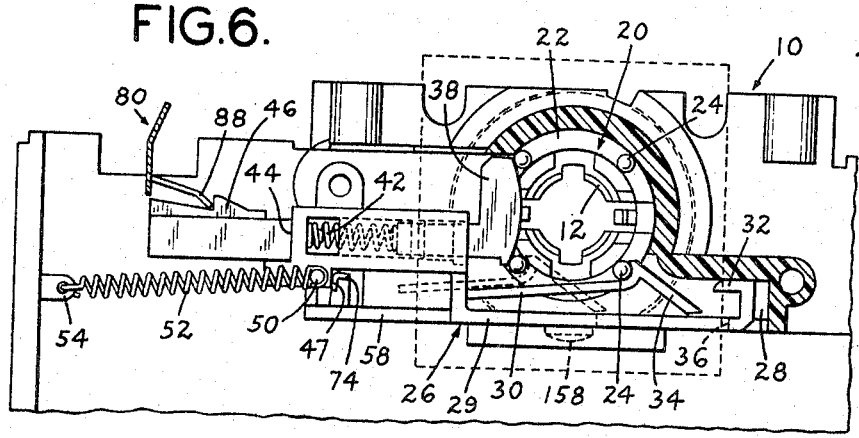
FIG. 6 is a bottom cross section view of the apparatus of FIG. 2 taken generally on line 6—6 of that figure showing the actuator assembly in its cocked position.
Figure 7:
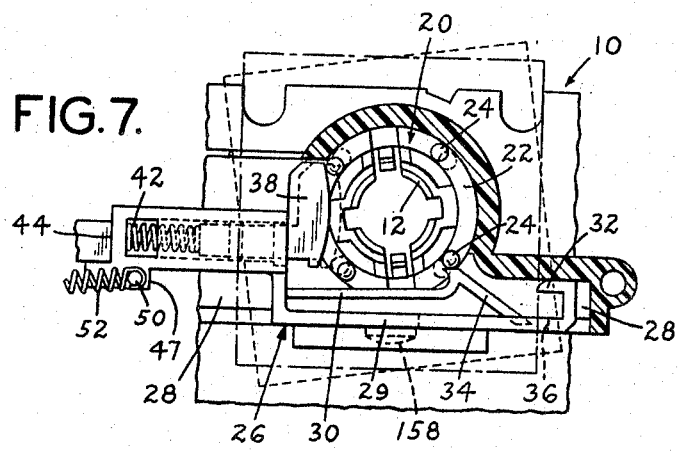
FIG. 7 is a partial cross section view of the apparatus of FIG. 6 showing the aligning foot just before the actuator assembly reaches its fully aligned position which is shown in phantom.

Referring now to FIGS. 5, 6 and 7, the operation of the actuator assembly in rotating socket 12 will be described. Each of these figures looks at the assembly and socket from the underside instead of from the top as in FIGS. 1 and 3. FIG. 5 shows the actuator assembly in its rest position with pawl 30 engaged with one of pins 24, and with pinstop 32 preventing further rotation of the pinwheel and socket by lying across the path of movement of another pin. FIG. 7 shows the assembly at the point just before it reaches its cocked position when foot 38 first contacts one of pins 24. The flash unit is shown in phantom by dashed lines in each of these views (as well as in FIGS. 1–4) and has been rotated counterclockwise slightly in FIG. 7 due to the force of slider 34 on another pin 24 as pawl 30 slides past that pin. Foot 38 halts this counterclockwise movement by its contact with pin 24 and urges the pinwheel and socket clockwise as the assembly is advanced until the latter reaches its cocked position as shown in FIG. 6. In that figure foot 38 is wedged between two of the pins to give perfect socket alignment. Since the foot is spring biased, it can be moved against the force of the spring and therefore does not prevent manual rotation of the socket in either direction when the assembly is in its cocked position. A twist on the flash unit (or flash cube as it is popularly known) will bring a fresh bulb into firing position, and the socket and bulb will be automatically aligned again by the foot as it becomes wedged between the pinwheel pins. It should be noted that the socket can also be manually rotated in either direction with the assembly in its rest position. Under such conditions when the flash unit is twisted in one direction, the engaged pinwheel pin draws the pawl and assembly toward its cocked position. Before it reaches that position, however, the pull on the pawl becomes too great and the pin disengages from the pawl which slides back with the assembly to its rest position under the influence of spring 52. With the assembly at rest if the flash unit is twisted in the opposite direction, the pin contacting pinstop 32 is forced over the stop which bends a little under the pressure. Further twisting in this direction causes the pin to engage the move over slider 34 until it passes the slider and is engaged by the pawl and another pin contacts pinstop 32. The high strength, flexibility and resilience of the socket, pinwheel, and assembly elements are such that manual rotation of the socket will not damage the mechanism regardless of which position the assembly is in when the flash unit is manually rotated. Since manual rotation can be accomplished without damaging the device, the flash unit can be rotated by hand in either direction any desired number of degrees without affecting the automatic rotation feature of the socket. Thus, if the assembly is cocked when the flash unit is manually rotated, the unit will be rotated again this time automatically as soon as the next picture is taken and the shutter button is released.

Referring now to FIGS. 4 and 14, the details and operation of the mechanism for changing the speed of the camera shutter 107 will be explained. The shutter has two basic speeds, a fast and a slow. When no flashlamp unit is inserted in the socket, the shutter speed is fast because the shutter is only permitted to pivot downwardly a short distance before being stopped. Its downward motion is halted by a finger 138 which engages a detent 142 on the shutter. Finger 138 forms one end of a lever 146 which is pivotally mounted between its ends on the camera body about a pin 128. A spring 130 engages both the lever and the camera body and urges the lever clockwise about pin 128 so that finger 138 normally lies in the path of detent 142.

Preferably the shutter mechanism is mounted on a plate 132 which has an opening 134 through which finger 138 extends to perform its work. The opposite end of lever 146 comprises a finger 136 which engages the bottom of an ejector rod 122 and urges it upward. Rod 122 has a key 140 along its length and is movably mounted in a keyed opening 124 (see FIGS. 4 and 5) in the camera body. Its head 144 cooperates with the foot of the flashlamp unit which drives the rod downwardly to the position seen in FIG. 4 when inserted in the camera socket.

It will be noticed that finger 136 contacts only one part of the bottom of the rod, namely a surface 126. As the unit is inserted, surface 126 drives finger 136 through an arc about pin 128. This moves finger 138 out of the path of movement of detent 142 which lengthens the speed of the shutter because its downward movement is not halted until it contacts a lower finger 148, thus allowing more time to elapse before it covers the light opening 149 which is shown in phantom.

The other half of the bottom of rod 122 comprises a follower 150 which cooperates with a cam surface 152 on the ejector button 154 best seen in FIG. 14. Also cooperating with button 154 is a compression spring 156 which is seated in a depression 158 best seen in FIGS. 5–7. This spring keeps the handle portion 160 of the ejector button in place above the lens at the front of the camera as seen in FIG. 1. Cam 152 is offset to one side of button 122 so that when the button is pushed the cam will engage only the follower portion 150 of the bottom of the ejector rod. Pushing the button drives cam 152 into follower 150 and causes the rod to raise up and eject the flashlamp unit. At the same time spring 130 rotates lever 146 clockwise until finger 136 contacts the edge of opening 124. In this condition the shutter has returned to its fast speed because finger 122 again lies in the path of detent 142.

Having described the invention in detail, it will be instructive to discuss some of the materials from which the various parts may be made. The body of the camera is preferably made out of a standard thermoplastic resin such as Dylene while the film winding lever 62, the ejector rod 122, the ejector button 154 and the shutter button 92 are preferably made from a thermoplastic acetal resin material such as Delrin which is characterized by high strength and stiffness combined with toughness and resilience over a wide temperature range. The actuator assembly 26 and foot 38 are also preferably made out of Delrin. The socket 12 and pinwheel 20 are preferably made of nylon for flexibility so that the pins 24 will be less likely to break in use. Lock member 80, pawl 70 and the shutter mechanism are preferably made of some sheet metal such as brass which is either left in its shiny state or blackened according to the particular use to which it will be put. Lever 126 is also preferably brass. Contacts 162, 164, seen in FIG. 1, are part of the electrical flash circuitry of the camera and are designed for use with the standard flashlamp units being sold today for use in camera sockets.

It will be understood that various changes in the details, materials, steps and arrangements of parts, which have been herein described and illustrated in order to explain the nature of the invention, may be made by those skilled in the art within the principle and scope of the invention. For example, instead of having the pawl mounted so that it rotates the socket while moving from its cocked or energized position to its rest or deenergized position, it may be mounted in the opposite direction so that socket rotation is accomplished during the first full stroke of the winding means as the pawl is driven from its rest into its cocked position.

What is claimed is:

1. A photographic camera having film winding means, a built-in flash device for use with an attachable flash unit having a plurality of flash bulbs therein, said device including a rotatable member to which said flash unit is releasably connectable, a shutter release member, and means for automatically rotating said rotatable member a predetermined amount on return of said shutter release member to a predetermined position, after each exposure is made, said means comprising a drive member rigidly and coaxially connected with said rotatable member, an actuator assembly including a pawl slidable between an energized and deenergized position in which said pawl is engaged with said drive member, and spring means adapted to automatically rotate said drive member and thereby said rotatable member said predetermined amount by sliding said assembly and pawl from said energized to said deenergized position in response to return of said shutter release member to said predetermined position after each exposure is made, said assembly and pawl being thereafter returned from said deenergized to said energized position against the force of said spring means in response to operation of said film winding means as said camera is reset for another exposure.

2. A photographic camera according to claim 1 for use with film having spaced metering apertures on one edge which film is housed in a cartridge of the type including spaced parallel spools and a narrow compartment through which said film is adapted to pass as it is wound off one spool onto the other said camera having a shutter, a pivotally mounted tripping member and a metering plate pivoted about a point within said camera which permits a portion of said plate to move in an arcuate path toward and away from said film, said portion comprising a finger, spring means normally urging the end of said finger against said film so that it enters one of said metering apertures on the edge of said film when said film has been moved to frame an unexposed portion thereof for the next picture, said tripping member having a portion thereon for actuating said shutter and another portion thereon for pivoting said plate about said point to remove said finger from said aperture after said shutter has been actuated.

3. A photographic camera according to claim 1 wherein there is a shutter, a pivotally mounted tripping member having a portion thereon for actuating said shutter and means for locking said mechanism against rotating said member after one of said bulbs has been brought into said firing position before said shutter has been actuated, and said tripping member has another portion thereon for operating said locking means after said shutter has been actuated to unlock said mechanism and permit it to rotate said rotatable member to advance a different one of said bulbs to said firing position.

4. A photographic camera according to claim 1 wherein said flash device includes an electrical flash circuit for whatever flash bulb is in said firing position, said camera including a shutter, and a pivotally mounted tripping member which forms part of said circuit, said member having an electrically conductive portion thereon for actuating said shutter and another portion thereon for completing and closing said circuit to fire said bulb in said position a predetermined interval of time after said shutter has been actuated.

5. A camera according to claim 1 wherein said drive member comprises a pinwheel having a plurality of pins thereon with which said pawl is successively engaged to rotate said pinwheel, there being a pinstop member on said assembly which halts the rotation of said pinwheel by intersecting the path of travel of one of its pins as said pawl reaches its deenergized position.

6. A camera according to claim 1 wherein said assembly includes means for adjusting the rotational position of said pinwheel as said pawl approaches said energized position to assure proper alignment of said rotatable member with one of said flash bulbs in a firing locus.

7. A camera according to claim 5 wherein said assembly includes means for adjusting the rotational position of said pinwheel as said assembly approaches its energized position to assure proper orientation of said rotatable member with one of said flash bulbs in a firing locus.

8. A camera according to claim 6 wherein said pawl forms an integral part of said assembly and means are provided for holding said assembly and pawl in said energized position until after the shutter release member has been returned to said predetermined position.

9. A camera according to claim 8 wherein said holding means comprises a spring biased lock member pivotally mounted in said camera for automatic engagement with said assembly when it is set in said energized position.

10. A camera according to claim 9 wherein there is a cam element on said shutter release member which engages and drives said assembly further into said energized position as said release member is operated, thereby loosening the engagement of said lock member with said assembly, said camera also having a shutter mechanism which includes a member for tripping the shutter and for thereafter pivoting said lock member away from engagement with said assembly.

11. A photographic camera according to claim 1 wherein said rotatable member comprises a socket, said drive member comprises a pinwheel and said pawl comprises an integral portion of said assembly.

12. A camera according to claim 11 wherein there is a pinstop member mounted on said assembly for halting the rotation of said pinwheel by engaging said pinwheel as said assembly reaches said deenergized position, and there are means also mounted on said assembly for adjusting the rotational position of said pinwheel to assure proper alignment of said socket with one of said flash bulbs in a firing locus, as said pawl approaches said energized position, said means comprising a foot member and a spring carried by said assembly biasing said foot member into a predetermined position on said assembly.

13. A camera according to claim 12 wherein a spring biased lock member is pivotally mounted in said camera to automatically hold said assembly in said energized position, said lock member having a lock arm for engaging said assembly in said energized position and preventing its return to said deenergized position during such engagement.

14. A camera according to claim 13 wherein there is a shutter mechanism including a shutter and means comprising a cam element mounted on said shutter release member for loosening the engagement of said lock member with said assembly in response to operation of said release member, and there is a tripping member in said mechanism for thereafter actuating said shutter and pivoting said lock member out of engagement with said assembly a predetermined length of time after actuating said shutter.

15. A camera according to claim 14 wherein said cam element has a surface which becomes disengaged from said assembly as said shutter release member returns to said predetermined position thereby rendering said assembly operative again permitting it to be moved by said spring means back to its rest position.

16. In a camera according to claim 11 a two speed shutter and a member both for ejecting a flash unit from said socket and for changing the speed of said shutter from one speed to another in response to insertion and removal of said flash unit from said socket, said ejection member including a bottom surface having a follower portion and a cam portion, there being a spring returnable element having a cam thereon for cooperation with said follower portion to operate said ejection member and thereby eject from the camera any flash unit connected in said socket and a linkage operable in response to movement of said cam portion of said surface to change said shutter speed from said one speed to another.

17. In a camera having an apparatus according to claim 16 the combination wherein said follower portion and said cam portion of said bottom surface comprise flat surfaces disposed at different angles with respect to the lengthwise axis of said member.

18. In a photographic camera for use with film having spaced metering apertures on one edge thereof and housed in a cartridge of the type including spaced parallel spools and a narrow compartment through which said film is adapted to pass as it is wound off one spool onto the other said camera having a built-in flash device including a rotatable member for carrying an attachable flash unit having a plurality of flash bulbs therein, a mechanism for automatically rotating said member to advance said unit a predetermined amount to bring a different one of said bulbs to a firing position before each picture is taken, means for repeatedly locking said mechanism against rotating said member after one of said bulbs has been brought to said firing position before said shutter has been actuated, a metering plate pivoted about a point within said camera which permits a portion of said plate to move in an arcuate path toward and away from said film, said plate portion comprising a finger, spring means normally urging the end of said finger against said film so that it enters one of said metering apertures on the edge of said film when said film has been moved to frame an unexposed portion thereof, said device includes an electrical flash circuit for firing whatever bulb is in said firing position when a picture is taken; the combination comprising a shutter and an electrically conductive pivotally mounted tripping member forming part of said flash circuit having one portion thereon for actuating said shutter, another portion thereon for thereafter completing and closing said flash circuit a predetermined length of time after said shutter has been actuated, a third portion thereon for pivoting said metering plate about said point to remove said finger from said aperture after said shutter has been actuated, and a fourth portion thereon for operating said locking means after said shutter has been operated to unlock said mechanism and allow it to rotate said member again to advance another one of said bulbs to said firing position.

19. In a photographic camera having film winding means, a built-in flash device with a rotatable member for carrying an attachable flash unit having a plurality of flash bulbs therein and a pawl slideable between an energized and a deenergized position for automatically rotating said member to advance said unit a predetermined amount to align a different one of said bulbs in a firing position before each picture is taken, the combination wherein said pawl is movable to its energized position in response to operation of said film winding means and there are means for locking said pawl in said energized position before each picture is taken, and means for releasing said pawl from said energized position after each picture is taken.

20. Apparatus according to claim 19 wherein said camera includes a shutter, a tripping member for actuating said shutter and is adapted for use with film having spaced metering apertures on one edge thereof and housed in a cartridge of the type including spaced parallel spools and a narrow compartment through which said film is adapted to pass as it is wound off one spool onto the other, and there is a metering plate pivoted about a point within said camera which permits a portion of said plate to move in an arcuate path toward and away from said film, said plate portion comprising a finger, spring means normally urging the end of said finger against said film so that it enters one of said metering apertures on the edge of said film when said film has been moved to frame an unexposed portion thereof, and said tripping member includes a portion thereon for pivoting said plate about said point to remove said finger from said aperture after said shutter has been actuated.

21. A photographic camera having film winding means and a built-in rotatable member for carrying a flash unit having a plurality of flash bulbs therein, the improvement comprising an actuator assembly including a pawl engageable with said member for rotating said member a predetermined amount to align a different one of said flash bulbs in a firing position before each picture is taken, said pawl having a deenergized and an energized position spaced apart from each other and being slideable from said deenergized position to said energized position in response to operation of said film winding means, spring means for sliding said pawl from said energized to said deenergized position after each exposure is made and means operable during operation of said film winding means for locking said pawl in said energized position before each exposure is made.

References Cited

UNITED STATES PATENTS

| 3,148,605 | 9/1964 | Peterson et al. | 95—31 |
|---|---|---|---|
| 3,232,196 | 2/1966 | Sapp et al. | 95—31 |
| 3,326,103 | 6/1967 | Topaz | 95—10 |
| 3,335,651 | 8/1967 | Williams et al. | 240—37.1 |
| 3,353,466 | 11/1967 | Charney | 95—11.5 |
| 3,353,467 | 11/1967 | Ernisse et al. | 240—1.3 |
| 3,354,300 | 11/1967 | Parsons et al. | 240—37.1 |
| 3,363,526 | 1/1968 | Ernisse | 240—1.3 |
| 3,369,468 | 2/1968 | Sapp et al. | 240—1.3 |
| 3,373,670 | 3/1968 | Lawson | 95—11 |
| 3,374,720 | 3/1968 | Harvey | 95—11.5 |

NORTON ANSHER, Primary Examiner

J. F. PETERS, JR., Assistant Examiner

U.S. Cl. X.R.

95—31, 11.5; 240—37.1